(12) United States Patent
Glenn

(10) Patent No.: US 7,202,900 B2
(45) Date of Patent: Apr. 10, 2007

(54) METHOD OF PRODUCING FRAME PAIR SIGNALS FROM AN IMAGE SENSOR AND METHOD FOR DISPLAYING SAME

(75) Inventor: William E. Glenn, Ft. Lauderdale, FL (US)

(73) Assignee: Florida Atlantic University, Boca Raton, FL (US)

( * ) Notice: Subject to any disclaimer, the term of this patent is extended or adjusted under 35 U.S.C. 154(b) by 521 days.

(21) Appl. No.: 10/227,597

(22) Filed: Aug. 22, 2002

(65) Prior Publication Data

US 2003/0052974 A1    Mar. 20, 2003

Related U.S. Application Data

(60) Provisional application No. 60/314,209, filed on Aug. 22, 2001.

(51) Int. Cl.
*H04N 3/14*    (2006.01)
*H04N 5/335*   (2006.01)
*H04N 9/04*    (2006.01)
*H04N 9/083*   (2006.01)

(52) U.S. Cl. .................. 348/315; 348/273; 348/275
(58) Field of Classification Search ............ 348/273, 348/275, 315
See application file for complete search history.

(56) References Cited

U.S. PATENT DOCUMENTS

| | | | | | |
|---|---|---|---|---|---|
| 2,222,934 A | * | 11/1940 | Blumlein | ............... | 348/206 |
| 4,602,289 A | * | 7/1986 | Sekine | ............... | 348/315 |
| 4,605,952 A | * | 8/1986 | Powers | ............... | 375/240.01 |
| 5,280,347 A | * | 1/1994 | Shiraishi et al. | ....... | 348/223.1 |
| 5,446,493 A | * | 8/1995 | Endo et al. | ............ | 348/320 |
| 5,995,152 A | * | 11/1999 | Labuda | ............... | 375/240.01 |
| 6,249,643 B1 | * | 6/2001 | Mimura | ............... | 386/107 |
| 6,657,755 B1 | * | 12/2003 | Campbell | ............ | 358/514 |
| 6,876,388 B1 | * | 4/2005 | Lee et al. | ............. | 348/305 |

\* cited by examiner

*Primary Examiner*—Ngoc-Yen Vu
*Assistant Examiner*—Daniel Pasiewicz
(74) *Attorney, Agent, or Firm*—Martin Novack

(57) ABSTRACT

A method is disclosed for producing progressive scan signals representative of an image of a scene, including the following steps: providing an image sensor onto which the image is projected, the image sensor having a diagonal pixel pattern; producing frame pairs as follows: during one frame of a frame pair, outputting pixel values alternately from successive adjacent line pairs of the sensor, starting at an odd numbered line, and, during the other frame of a frame pair, outputting pixel values alternately from successive adjacent line pairs of the sensor, starting at an even numbered line.

3 Claims, 3 Drawing Sheets

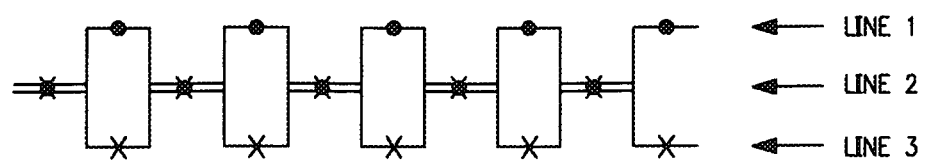
FIG. 5
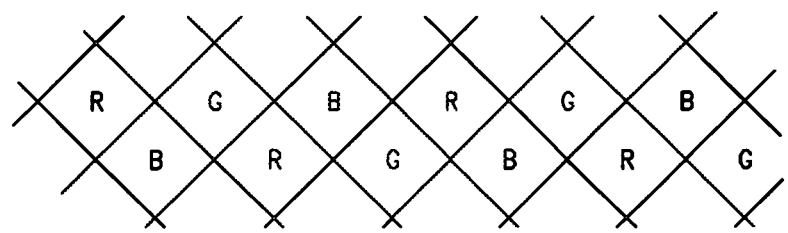
FIG. 6
FIG. 7

METHOD OF PRODUCING FRAME PAIR SIGNALS FROM AN IMAGE SENSOR AND METHOD FOR DISPLAYING SAME

RELATED APPLICATION

The present application claims priority from U.S. Provisional Patent Application Ser. No. 60/314,209, filed Aug. 22, 2001 and said Provisional Application is incorporated herein by reference.

FIELD OF THE INVENTION

This invention relates to the field of producing and displaying of video signals, such as for television.

BACKGROUND OF THE INVENTION

As background reference can be made for example, to my U.S. Pat. Nos. 6,208,382 and 6,266,093, and to my copending U.S. patent application Ser. Nos. 09/653,983 and 09/954,969, all assigned to the same assignee as the present application.

It is among the objects hereof to devise improved techniques and apparatus for producing and displaying video signals.

SUMMARY OF THE INVENTION

In a form of the present invention, a television system uses diagonal sampling as a way of providing progressive scan at 60 FPS at the same bit rate as interlaced scan at 30 FPS.

Diagonal sampling reduces the number of pixels in an image by a factor of two. This allows one to increase the frame rate from 30I to 60P at the same bit rate. The perceived sharpness is actually slightly higher with this scan than with the cardinally sampled interlaced scan. Diagonal sampling matches the performance of the visual system and scene statistics better. All other things being equal, the perceived resolution is lowered by 1.4 rather than the two-fold reduction in number of pixels. In addition to this factor, the perceived resolution is further improved by almost a factor of two by going from interlace to progressive scan. The progressive scan does not have the interlace artifacts. The color signals can be derived from the RGB signals and transmitted with every other pixel on every other line. In this way, two color signals can be transmitted with half the bit rate of luminance. The color signals are also diagonally sampled. The display can be, for example, a matrix addressed light valve with the same filter pattern as the camera sensor. Alternatively, a standard color CRT, or a digitally addressed display, or any other suitable display, can be used.

In order to maintain compatibility with interlaced transmissions, a technique of the general type first employed by A. P. Blumlein in England during the 1930's can be used. This was called "synchronous spot wobble." If the spot on a CRT is wobbled vertically by half the line spacing the information from two lines can be displayed by presenting the information from one line when the spot is up and from the other line when the spot is down. This produces a diagonally sampled image. It doubles the number of lines without changing the horizontal resolution of the two lines put together. If the transmission uses this technique, two lines can be transmitted with one horizontal scan. A field line of an interlaced scan can become two frame lines diagonally sampled. In this way a frame can be displayed, for example, every 60th of a second. The display would have all of the advantages of progressive scan. If the display does not have the vertical wobble, the image would look like a normal interlaced image. For digitally addressed displays, the addressing can, for example, display every other pixel on one line followed by the intervening pixels from a line store on the next line.

BRIEF DESCRIPTION OF THE DRAWINGS

FIG. 5 shows an embodiment for displaying video signals.

FIGS. 6 and 7 show embodiments that can be used for representative color displays.

DETAILED DESCRIPTION

Figure 1:
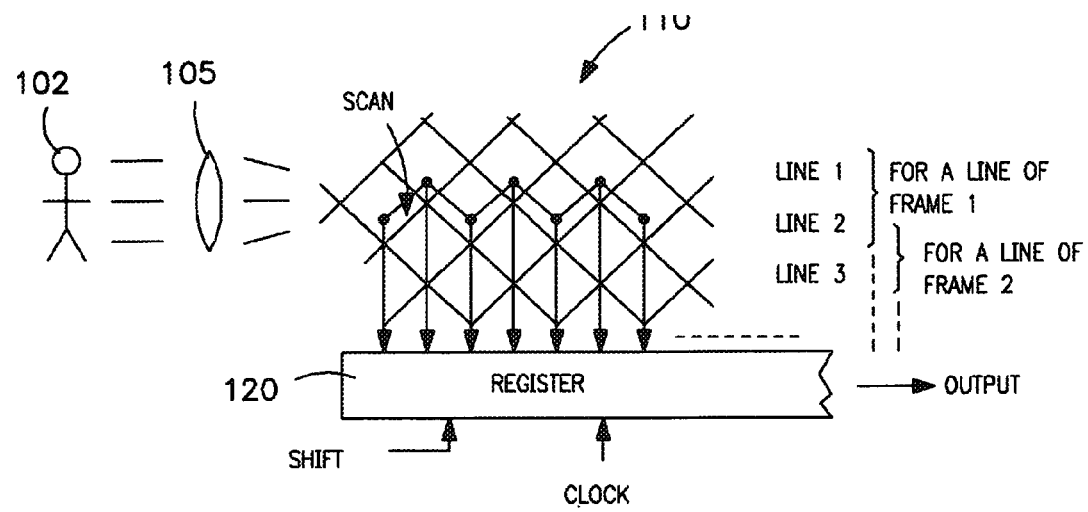
FIG. 1 is a diagram, partially in block form, illustrating an embodiment of the invention for generating video signals.

In FIG. 1, an image, which can be a moving image, from a scene 102, is projected by camera lens system 105 on a diagonally oriented solid state image sensor 110, a representative portion of which is shown in FIG. 1. For a diagonally sampled CCD, the pixels look as shown in the Figure. Lines 1, 2 and 3 are identified in the illustration, which shows how line pairs are clocked into the horizontal register 120 for lines of the first frame and lines of the second frame. The output has the two lines dot sequentially in its output. To make it compatible with interlace, two lines are clocked out at a time during one frame (lines 1 and 2, then 3 and 4, and so on). For the next frame, the register system shifts down one line and clocks out the next lien pairs (lines 2 and 3, then 4 and 5, and so on).

Figure 2:
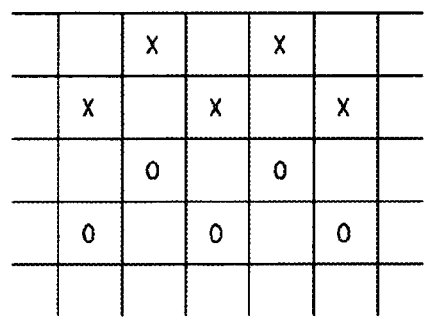
FIGS. 2, 3 and 4 illustrate operation of another form of the invention for generating video signals.
Figure 3:
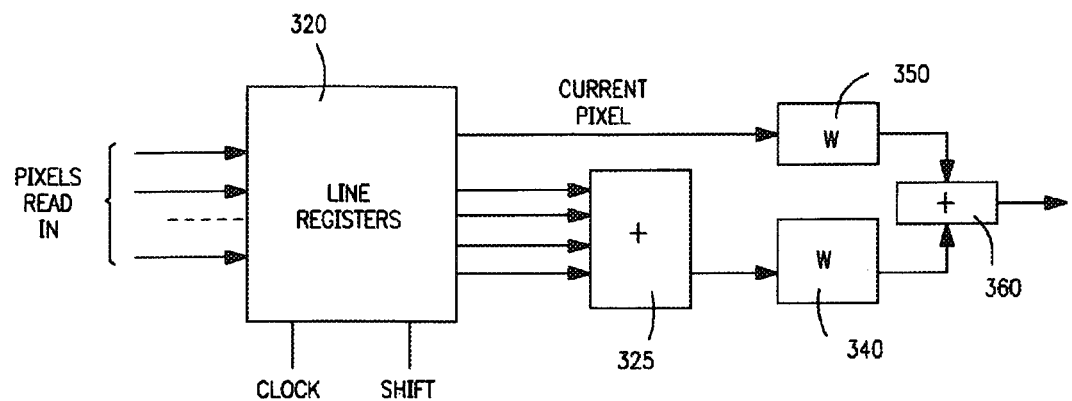
Figure 4:
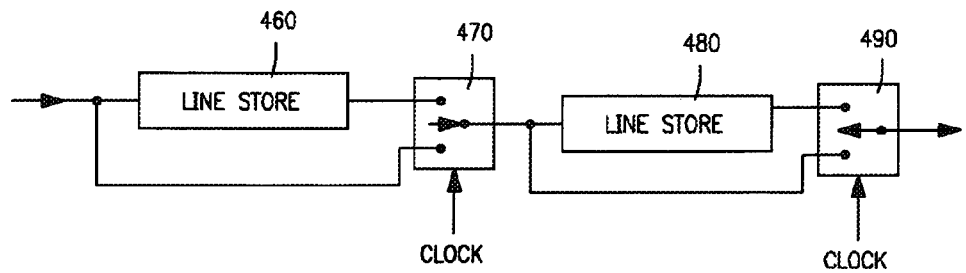

If the signal is to be obtained from a progressively scanned camera at 60 FPS, the signals can be derived from a cardinally sampled image as illustrated in FIGS. 2, 3, and 4. First, a new set of values is calculated for each of the pixels that have X or O. Each of these pixels has added to it the average of the four surrounding pixels. As in FIG. 3, the pixel signals are read into line registers 320. An output thereof, the current pixel (the designated center pixel) is coupled to weighting block 350. Also, the four surrounding pixels (above, below, right, left) are coupled to adder 325 and the sum is weighted (block 340). The output is obtained by summing (block 360) the signals from blocks 340 and 350. The output then leaves out the pixels that don't have X or O with, for example, the approach shown in FIG. 4. In FIG. 4, the input is coupled to line store 460. The input is also coupled to a multiplexer 470, the other input to which is the output of line store 460. This multiplexer is switched at the line rate. The multiplexer 470 output is one input to another line store and is also input to another line store 480. The outputs of multiplexer 470 and line store 480 are coupled to another multiplexer 490 which is switched at the pixel rate. In operation, the multiplexer 470 changes its sense at the frame rate, so that it alternates the odd/even sense of the lines from frame to frame, to make it compatible with interlace. The multiplexer 490 operates at the pixel rate. It alternately clocks out pixels from two adjacent lines.

For the display, a normal interlaced scan can be used. A small coil on the neck of the CRT can deflect the beam vertically by one frame line at half the clock rate, as illustrated in FIG. 5. Ideally a square wave shape can be used. On one field, lines 1 and 2 are displayed as a pair. On the next field lines 2 and 3 are displayed as a pair, etc.

If a digital LCD or any digital or addressable display is used for the display, it can be advanced in similar fashion to that described for the sensor if the pixels are diagonally sampled.

If a Bayer pattern display is used, as shown in FIG. 6, then the green pixels are in the diagonal pattern. The red and blue pixels have to be derived and interleaved with the green.

If the diagonal RGB pattern is used, as shown in FIG. 7, then all colors can be written directly.

The invention claimed is:

1. For use in conjunction with an image sensor that produces signals representative of an image of a scene that is projected on the image sensor, the image sensor having a rectangularly arrayed pixel pattern that is progressively scanned at a particular bit rate, a method for producing an interlaced compatible signal from the progressively scanned image sensor, comprising the steps of:

combining values of center pixels from the progressively scanned image sensor with the values of four horizontally and vertically adjacent pixels to generate current pixels; and producing frame pairs as follows:

during one frame of a frame pair, outputting said current pixel values of every other pixel on every other line in a zig-zag pattern from adjacent line pairs of the sensor, starting at an odd numbered line, and, during the other frame of the frame pair, outputting current pixel values of every other line in a zig-zag pattern from adjacent line pairs of the sensor, starting at an even numbered line.

2. The method as defined by claim 1, further comprising:

displaying images represented by said interlaced compatible signal, said displaying including displaying frame pairs as follows:

during one frame of a frame pair, displaying current pixel values alternately from successive adjacent line pairs, starting at an odd numbered line, and, during the other frame of a the frame pair, displaying current pixel values alternately from successive adjacent line pairs, starting at an even numbered line.

3. The method as defined by 2, wherein said displaying of images includes deflecting a scanning beam between adjacent lines.

* * * * *

UNITED STATES PATENT AND TRADEMARK OFFICE
CERTIFICATE OF CORRECTION

PATENT NO. : 7,202,900 B2
APPLICATION NO. : 10/227597
DATED : April 10, 2007
INVENTOR(S) : William E. Glenn Page 1 of 1

It is certified that error appears in the above-identified patent and that said Letters Patent is hereby corrected as shown below:

Col. 1, after the title, insert the following:

--GOVERNMENT RIGHTS

This invention was made with government support under ONR Grant No. N00014-01-1-0246 awarded by Office of Navel Research. The government has certain rights in the invention.--

Signed and Sealed this

Seventh Day of August, 2007

JON W. DUDAS
*Director of the United States Patent and Trademark Office*